(12) United States Patent
Harper

(10) Patent No.: US 6,977,742 B2
(45) Date of Patent: Dec. 20, 2005

(54) METHOD AND APPARATUS FOR ESTIMATING PRINTER RESOURCES

(75) Inventor: Mark A. Harper, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 903 days.

(21) Appl. No.: 09/823,782

(22) Filed: Mar. 29, 2001

(65) Prior Publication Data

US 2002/0140959 A1 Oct. 3, 2002

(51) Int. Cl.[7] .................. G06F 15/00; G03G 15/00; G03G 15/08; H04N 1/00
(52) U.S. Cl. .................. 358/1.15; 358/1.13; 358/434; 399/24; 399/25; 399/27
(58) Field of Search .................. 358/1.13, 1.15, 358/434; 399/24, 25, 27

(56) References Cited

U.S. PATENT DOCUMENTS

| | | | |
|---|---|---|---|
| 5,021,826 A | | 6/1991 | Maruta |
| 5,096,180 A | | 3/1992 | Nagaoka et al. |
| 5,966,555 A | | 10/1999 | Nakajima et al. |
| 6,185,010 B1 | * | 2/2001 | Watanabe .................. 358/474 |
| 6,266,493 B1 | | 7/2001 | Farrell et al. |
| 6,348,971 B2 | * | 2/2002 | Owa et al. .................. 358/1.15 |
| 6,433,893 B1 | * | 8/2002 | Murayama .................. 358/434 |
| 6,584,291 B1 | * | 6/2003 | Yamamoto .................. 399/27 |
| 6,678,066 B1 | * | 1/2004 | Nakamura .................. 358/1.13 |

FOREIGN PATENT DOCUMENTS

| | | |
|---|---|---|
| EP | 0620503 A2 | 10/1994 |
| GB | 2368698 A | 5/2002 |
| GB | 2368953 A | 5/2002 |
| JP | 59007374 A | 1/1984 |
| JP | 10217583 A | 8/1998 |

* cited by examiner

Primary Examiner—Edward Coles
Assistant Examiner—Chan S. Park

(57) ABSTRACT

An apparatus for estimating printer resources compares an amount of printer resources required to print a document to an amount of printer resources available at a printer to determine whether sufficient resources are available to successfully print the document. If insufficient resources are available, the apparatus alerts the user so that the user may replenish the resources prior to printing. When used in a computer network, the apparatus causes the printer to switch from a client print server mode to a direct printing mode causing the printer to stop responding to print commands issued by a print server and to instead respond to print commands issued by a print driver associated with the apparatus.

12 Claims, 7 Drawing Sheets

METHOD AND APPARATUS FOR ESTIMATING PRINTER RESOURCES

The present invention generally relates to a print feature, and more particularly to a device that estimates the printer resources required by a printer to print a document and alerts a user who sent the document to the printer in the event that insufficient resources are available to print the document.

Conventional printers are not capable of estimating, in advance of printing, the print resources, such as, for example, paper and toner required by a printer to print a document sent to the printer by a user. As a result, the user may send a document to a printer for printing only to find out that the printer ran out of the resources necessary to complete the print job, i.e., to finish printing the document, causing the resulting product to have an unacceptable print quality. For example, if the printer's supply of paper runs out, the resulting print job will be missing pages, and thus incomplete. Alternatively, if the toner runs out or drops below a required minimum level, the resulting print job may be partially or totally illegible. In either event, all or at least portions of the unacceptable document must be re-sent to the printer resulting in a loss of efficiency for the user and/or lost resources. For a document that is non-critical, the loss in efficiency or resources may be tolerable. Such non-critical documents may include, for example, documents that are short in length so that reprinting the document results in wasting only a small amount of paper or toner. In addition, non-critical documents may include documents that are not time critical, i.e., are not required to satisfy an immediate deadline such that the time required to re-print the non-critical document does not adversely impact the user's ability to meet the deadline. However, the costs associated with having to reprint a document that is either resource critical or time critical are often intolerable. Such critical documents may include documents that are lengthy or that are needed to satisfy an impending deadline.

Thus, there is a need in the art for a device that estimates the resources required by a printer to print particular documents, such as critical documents, sent to the printer by a user. However, conventional networks are configured to send multiple print jobs originated by multiple users to a single printer using a single print server. In particular, conventional network users have access to one or more printers via a print server that is coupled to the network and that is further coupled to the printer. The print server stores, in a queued fashion, the print jobs or documents to be printed that have been received from the network users and transmits the stored print jobs to the attached printer for printing according to the order in which the print jobs were received and stored in the print server. As a result, if a typical network configuration is employed, determining whether a printer has sufficient resources to successfully print a critical document that is preceded in the print server by, for example, three other non-critical documents requires an estimation of not only the resources needed to print the critical document but also the resources needed to print the three non-critical documents pending in the print server. However, in most instances, as described above, the user is interested in determining only whether the critical document(s) will be successfully printed. As a result, a device capable of calculating the resources necessary to successfully print all of the pending documents regardless of their criticality would require an unwarranted level of computational complexity.

Thus, there is a further need in the art for a device that is compatible with conventional computer network configurations that utilize print servers to control printing tasks and that is capable of estimating the printer resources needed to successfully print selected documents, such as, for example, critical documents.

SUMMARY OF THE INVENTION

The present invention is directed to a unit that estimates the printer resources required by a printer to print a critical document and that alerts a user who sent the document to the printer in the event that insufficient resources are available to print the document. The device may be used in a computer system having a stand-alone computer coupled to a printer and may further be used in a network computer system having a computer coupled to a computer network that uses a print server to control a printer.

DETAILED DESCRIPTION

Figure 1:
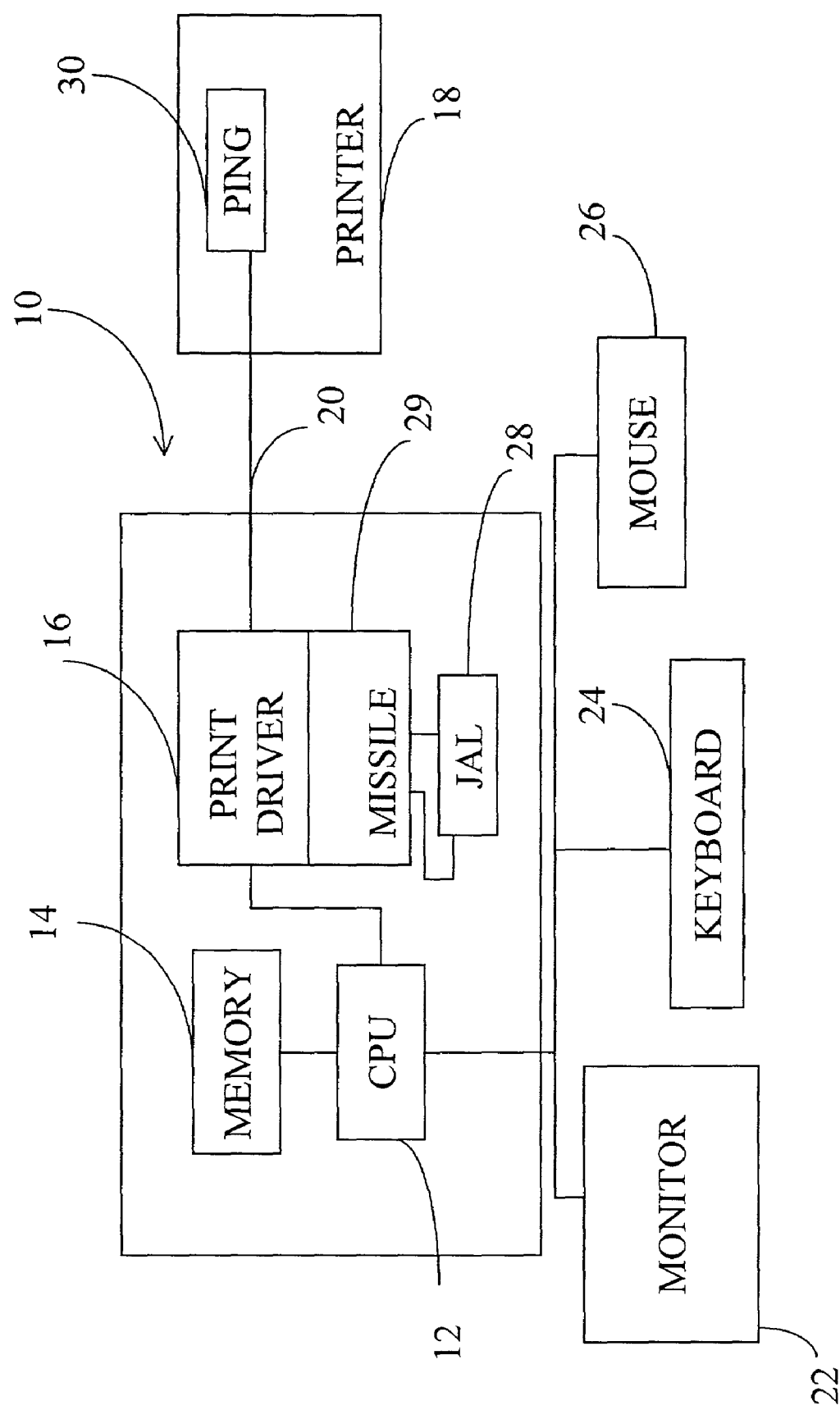
FIG. 1 is a block diagram of a printer coupled to a stand-alone computer having a job assurance logic (JAL) unit for estimating printer resources.

Referring now to FIG. 1, a stand-alone computer 10 includes a central processing unit (CPU) 12 coupled to a memory 14 and further coupled to a print driver 16. The print driver enables communication between the CPU 12 and a printer 18 via a printer cable 20. Print drivers are well known in the art and are conventionally implemented using software. As a result, the details of the print driver are not discussed further herein. A monitor 22, keyboard 24 and mouse 26 enable communication between a user and the CPU 12. Although not shown in FIG. 1, the computer 10 may further include any number of peripheral devices, for example, a modem, a sound card, a video card, etc. In addition, the printer 18 may be implemented using a laser jet printer, an inkjet printer, or any other device that may be used to print a document.

A job assurance logic (JAL) unit 28 disposed in the computer 10 is coupled to, and communicates with a software extension of the print driver 16, referred to as a missile 29, and further communicates with a ping device 30 disposed in the printer 18, via the print driver 16. The missile extension 29 of the print driver 16 and a printer having a ping device 30 disposed therein are both commercially available from Hewlett Packard® and are used to enable direct communication between the printer and the computer 10. The missile extension 29 is implemented using software code and the ping device 30 is implemented in the printer 18 using firmware. The reader is directed to U.S. Pat. No. 6,559,965, issued May 6, 2003, incorporated in its entirety by reference herein, which describes a print job language that the ping 30 and missile 29 devices may use to communicate. More particularly, conventional computers and printers are typically designed for uni-directional communication wherein the computer is capable of transmitting communications to the printer, but the printer, a passive device, does not transmit information to the computer and is not even informed as to the address of the computer. The print job language described in the above-referenced patent application enables two-way communication between a printer and a computer by providing the address of the computer to the printer so that the printer may transmit information back to the computer, if desired. Specifically, the missile extension 29 generates a print job language command, known as a socketping command, that includes a set of fields including a field containing the address of the computer 10 to enable bi-directional communication and may further include any number of extension fields designated to provide additional instructions to the printer 18. To enable operation with the job assurance logic unit 28 described herein, the socketping command will include an extension field designated to contain, and containing an instruction to transmit the requested information, i.e., the printer resource information.

Figure 2:
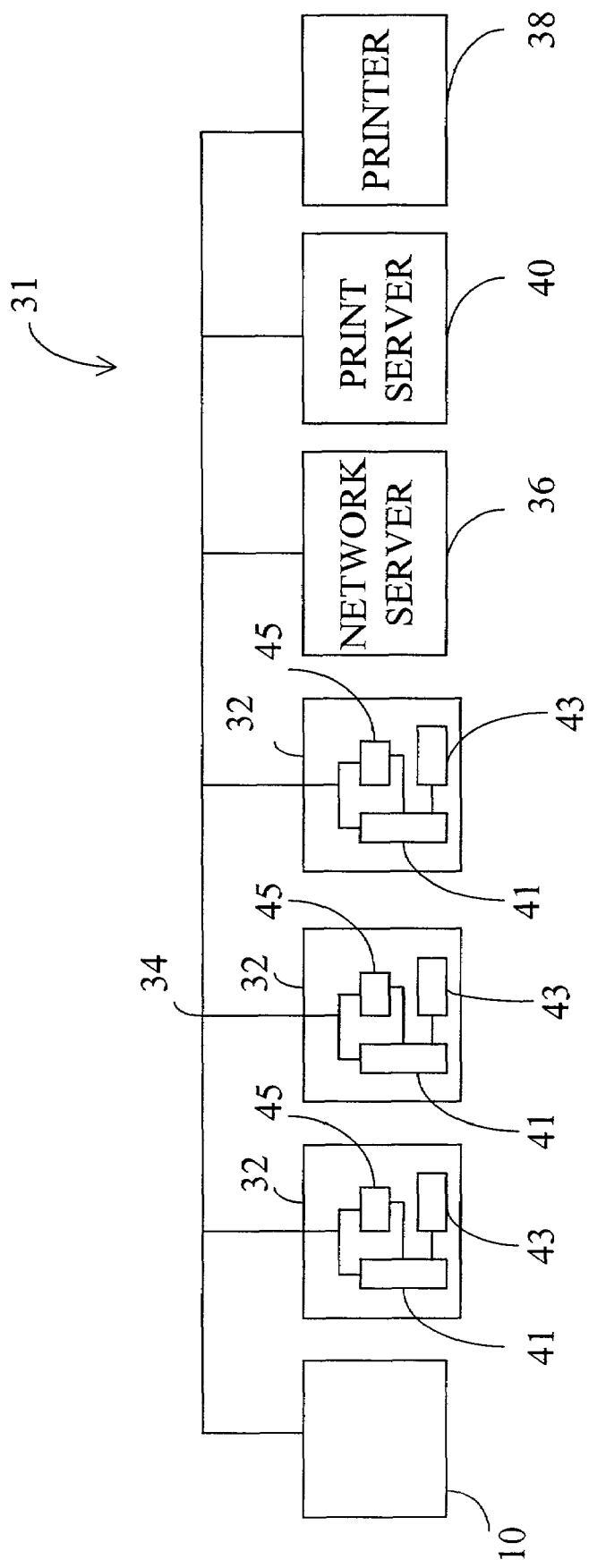
FIG. 2 is a block diagram of a printer and printer driver coupled to a network computer system that includes a computer having a JAL unit for estimating printer resources.

Referring now to FIG. 2, the computer 10 of FIG. 1, may instead be coupled to a computer network 31 that includes a plurality of user computers 32 coupled via a communication network 34 and further includes a network server 36, also coupled to the communication network 34, for controlling communication on the network 34. As will be understood by one having ordinary skill in the art, the communication network may be implemented using a hard-wired network or may instead be implemented via a wireless communication medium in which case each of the computers 10, 32 will include equipment for interfacing with a wireless communication network. In addition, one or more of the computers 10, 32 may be coupled to the network remotely via a telephone connection established using a modem. A printer 38 and print server 40 are further coupled to the communication network 34 and perform printing tasks to provide print capabilities to the user computers 32 and to the computer 10 coupled to the network 34. As is conventional, the print server 40 may be implemented with a computer that is programmed to temporarily store a set of documents for printing and to control the order in which the documents are supplied to the printer 38.

Each of the user computers 32 may include, for example, a central processing unit 41 coupled to a memory 43 and to a print driver 45. The print driver 45 disposed in each user computer is further coupled to the printer 38 and print server 40 via the network 34. Of course, each of the user computers 32 may further include a set of apparatus by which a user may communicate with the computers 32 including, for example, a monitor, a keyboard and a mouse, or may include any other desired peripherals or features (not shown).

Figure 3:
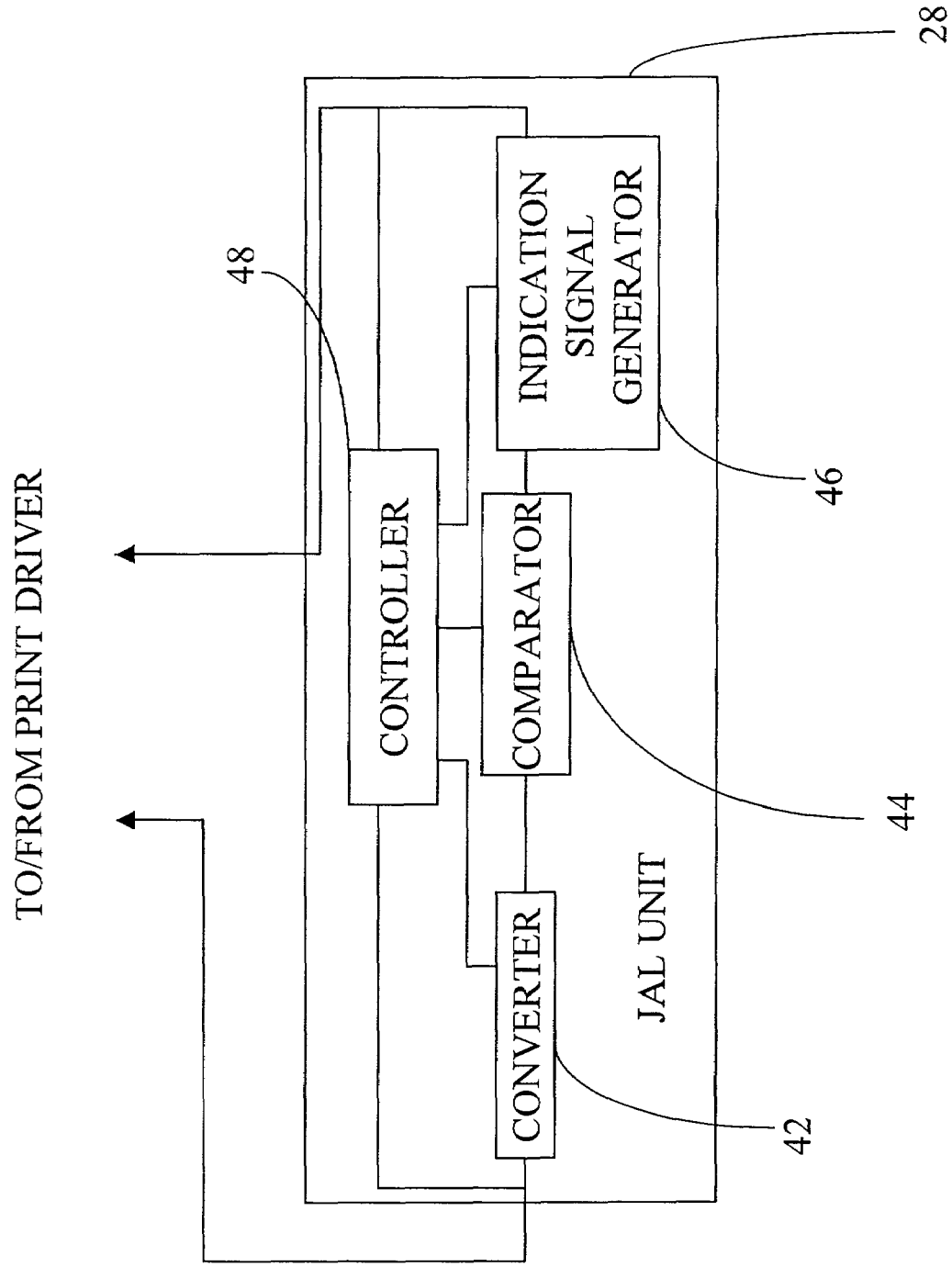
FIG. 3 is a block diagram of a JAL.

Referring now to FIG. 3, the JAL 28 disposed in the computer 10 is coupled to the print driver 16 and may include a converter 42 for converting information received from the print driver 16 into a common unit system. The information may include, for example, a first set of values that represent the amount of resources required to print a document and a second set of values that represent the amount of resources available at either of the printers 18, 38. The converter 42 is further coupled to a comparator 44 that receives the converted information, i.e., the first and second sets of values, and then compares the sets of values. More particularly, the value from the first set representing a first required resource may be compared to the value from the second set that represents the amount of the first resource that is available. The comparator 44 is further coupled to an indication signal generator 46 that causes an alert message to be generated in the event the comparisons performed at the comparator 44 reveal the amount of resources available at the printer 18 or 38 are insufficient to print the document. The converter 42, comparator 44 and indication signal generator 46 are further coupled to and controlled by a controller 48. As will be understood by one having ordinary skill in the art, the converter 42, the comparator 44, the indication signal generator 46 and the controller 48 may be implemented using hardware, software, firmware or a combination thereof.

More particularly, and referring still to FIG. 3, the controller 48 disposed in the JAL unit 28 that is associated with the computer 10 may be implemented using, for example, software code that when executed by the CPU 12 or any other computer processor, causes a method for estimating printer resources to be performed. In addition, the software code may vary depending on whether the JAL unit 28 is associated with the stand-alone computer 10 of FIG. 1 or with the computer 10 coupled to the communication network of FIG. 2.

Figure 4A:
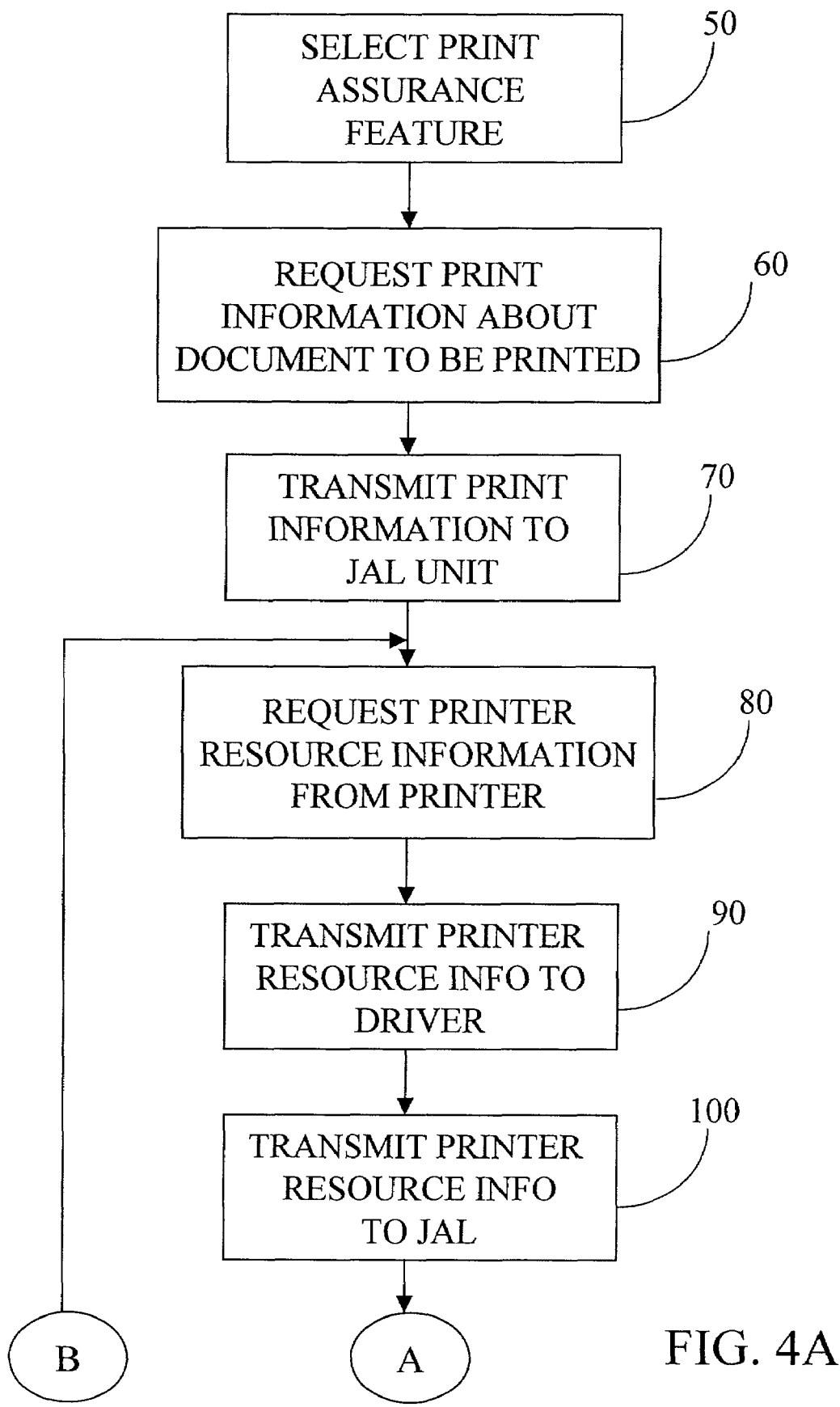
FIG. 4 is a flow chart that illustrates a method for implementing a JAL unit in a stand-alone computer system in accordance with the present invention; and, FIG. 5 is a flow chart that illustrates a method for implementing a JAL unit in a network computer system in accordance with the present invention.

Referring also to FIG. 4A, when associated with the stand-alone computer 10, the method may begin, for example, when a user selects a job assurance logic feature while operating a software application such as for example, a word processor, or a spreadsheet software package (step 50). Of course, the software application is embodied in a set of computer codes that are executed by the CPU 12. In one embodiment, selecting the print job assurance feature may be performed by using the mouse 26 to check a box appearing in a print information dialog window or screen display. The print information dialog window refers to any display of information that typically appears on the computer monitor 22 when a print feature associated with the software application is selected by which the user may specify print information. The print information specified is then used by the print driver 16 to generate an appropriate set of print commands that are subsequently transmitted to the printer 18. The print information dialog window may include, for example, a set of data fields that prompt the user to enter information that is required to enable printing. When the required information has been entered, the user may then select a print button appearing in the window using, for example, the mouse 26 or a hotkey. In response to selecting the print button, the print driver 16 uses the required information entered by the user to generate the appropriate set of print commands which are then sent to the printer 18 to thereby enable printing of the document. Such information may include, for example, the number of pages to be printed, the number of copies of the document to be printed, and whether the printed copies are to be collated or uncollated. When used in conjunction with a JAL unit 28, the print dialog window may further include, for example, a check box that, if checked by the user, causes the print driver 16 to invoke the JAL unit 18.

If the job assurance check box is checked such that the JAL unit 28 is invoked, the controller 48 causes the print driver 16 to request print information, from the software application, about the document to be printed (step 60). Such print information may include, for example, the number of pages to be printed and the characters to be printed per page. If the document includes one or more graphics, then the print information may further include the number and size of the graphics to be printed.

Next, the driver 16 receives the requested information provided by the software application and transmits the requested information to the JAL unit 28 where it is subsequently delivered to the converter 42 (step 70). As will be understood by one having ordinary skill in the art, the information may not actually be transmitted but may be stored in the memory 14 and the print driver 16 may inform the controller 48 as to the location at which the information is stored in the memory 14 so that the controller 48 can access the information. After having delivered the print information to the JAL 28, the controller 48 causes the driver 16 to request printer resource information from the printer 18 (step 80). The printer resource information may include, for example, the amount of toner left in the printer cartridge and may further include the number of pages of paper remaining in the printer 18.

Figure 4B:
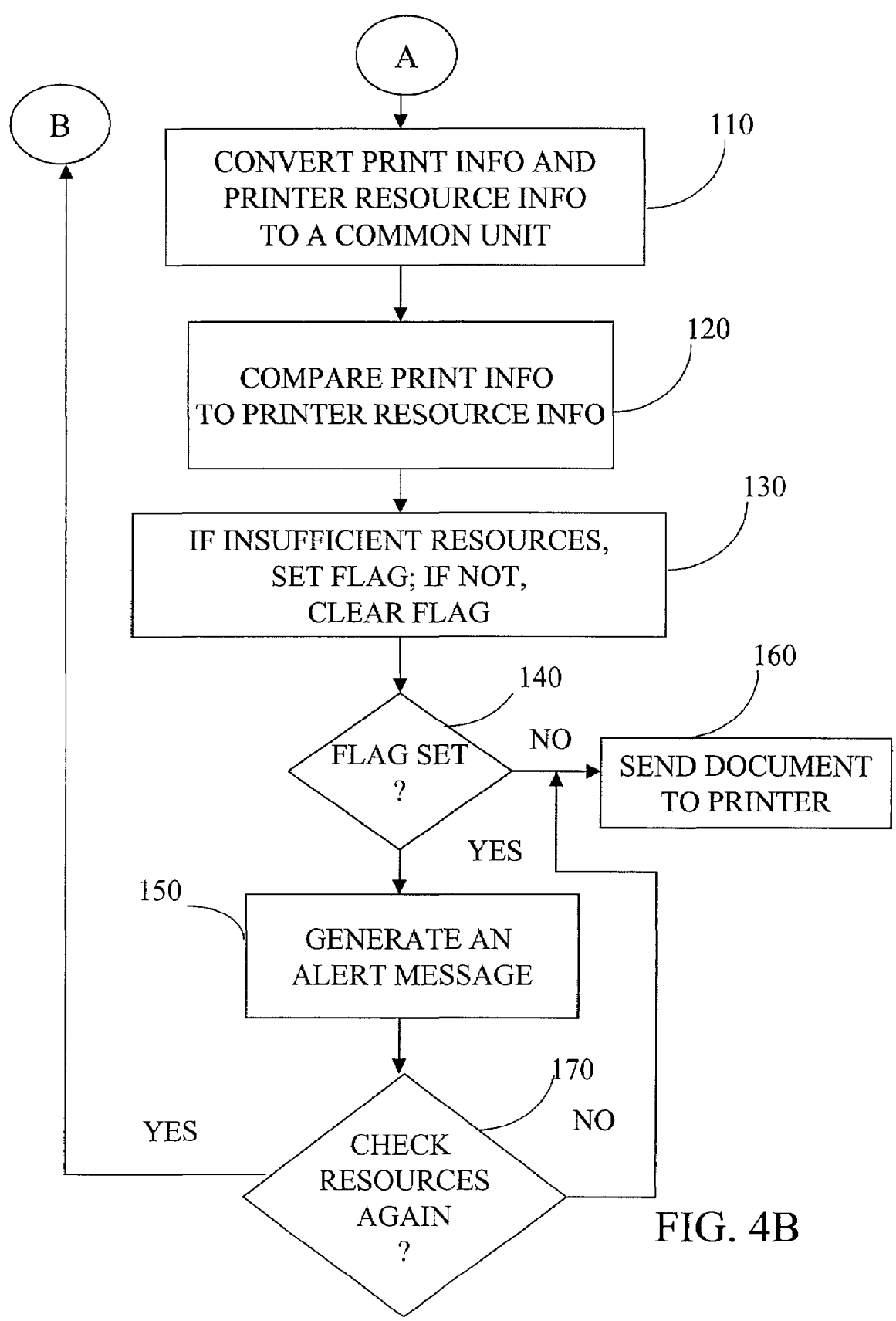

In response to the request, the ping firmware 30 transmits the printer resource information to the missile extension 29 of the print driver 16 (step 90), and then the print driver 16 causes the printer resource information received from the ping firmware 30 to be transmitted to the JAL unit 28 where it is subsequently delivered to the converter 42 (step 100). Referring also to FIG. 4B which aligns with FIG. 4A at connecting points A and B, next the controller 48 causes the converter 42 to convert the document print information and the printer resource information into the same units, if necessary, so that the information can be directly compared (step 110). After the information has been converted, the controller 48 causes the comparator 44 to compare, for example, the number of pages required to print the document to the number of pages of paper remaining in the printer (step 120). In addition, the controller 48 causes the comparator 44 to compare the amount of toner left in the printer cartridge to the amount of toner required to print the document (step 120). Provided that sufficient resources are available, the controller 48 causes a flag associated with each resource to be set (step 130). If instead sufficient resources are not available, then the controller clears the flag associated with the insufficient resource (step 130). As will be understood by one having ordinary skill in the art, at times, pages of paper stored in a printer paper tray may sometimes become stuck together causing more than a single sheet of paper to be routed through the printer 18 at a single time. As a result, although the printer 18 originally had sufficient paper to successfully print the document, the sheets that are routed through the printer together may deplete the paper resources causing the originally sufficient resources to be insufficient to successfully print the document. To ensure that this does not occur, the comparison flag indicating whether sufficient resources are available may, if desired, only be cleared in the event that the amount of available resources exceeds the amount of required resources by a predetermined amount. If the amount available does not exceed the amount required by this predetermined amount, then the controller 48 sets the flag to indicate that insufficient resources are available to successfully complete the print job. For example, when making the comparison, the comparator 44 may compare the amount of resources available to the amount of resources required, plus the predetermined amount. If the amount of resources available exceeds the amount of resources required by at least the predetermined amount, then the controller 48 clears the flag, if not, the controller 48 sets the flag.

Next, the controller 48 determines whether the printer 18 has sufficient resources to successfully print the document by checking the status of the flag (step 140). In the event the flag is cleared indicating sufficient resources are available, then the controller 48 causes the print driver 16 to transmit the document to the printer 18 with an appropriate set of print command codes to be used by the printer 18 print the document (step 160). If instead, the controller 48 determines the flag is clear indicating sufficient resources are not available, then the controller 48 causes the print driver 16 to generate a message for display on the monitor 22 that alerts the user about the insufficient resources (step 150). The content of the displayed message may take a variety of formats. For example, the message may specify which of the printer resources is insufficient. Or, the message may simply specify that insufficient resources are available without specifying which resource is depleted. In addition, the message may instruct the user to check and/or replenish the insufficient printer resource(s). As will be understood by one having ordinary skill in the art, identifying which of the printer resources is insufficient may not be necessary because the user may be able to make such a determination by checking the contents of the paper tray and if full, assuming that the toner is insufficient or if low, assuming that the paper tray needs to filled. One having ordinary skill in the art will further understand that instead of generating a message for display, the controller 48 may cause the driver to generate any type of signal to alert the user to the insufficient resources including an audible message or a printed message.

In addition, the alert message may include a mechanism by which the user may respond to the message. For example, the message may include two buttons selectable using the mouse 26, a first of which allows the user to ignore the insufficient resources warning and print the document (step 160), and a second that allows the user to cause the JAL unit 28 to check the availability of the printer resources again (step 170 and steps 80–140). For example, assuming the message has been generated and the user, after inspecting the printer 18, has identified and rectified the resource deficiency, the user may then elect to check the resources again by pressing the second button. If the second button is pressed, the controller 48 again requests printer resource information from the printer (step 80) and repeats the process described above (steps 80–140), thereby causing the JAL unit 28 to again check the sufficiency of the resources available at the printer 18. If the resource deficiency has been rectified, then the method will terminate when the controller 48 causes the driver 16 to send the document to the printer 18, and if the resource deficiency has not in fact been rectified, then the controller 48 will again cause the print driver 16 to generate a message alerting the user to the deficiency.

Figure 5A:
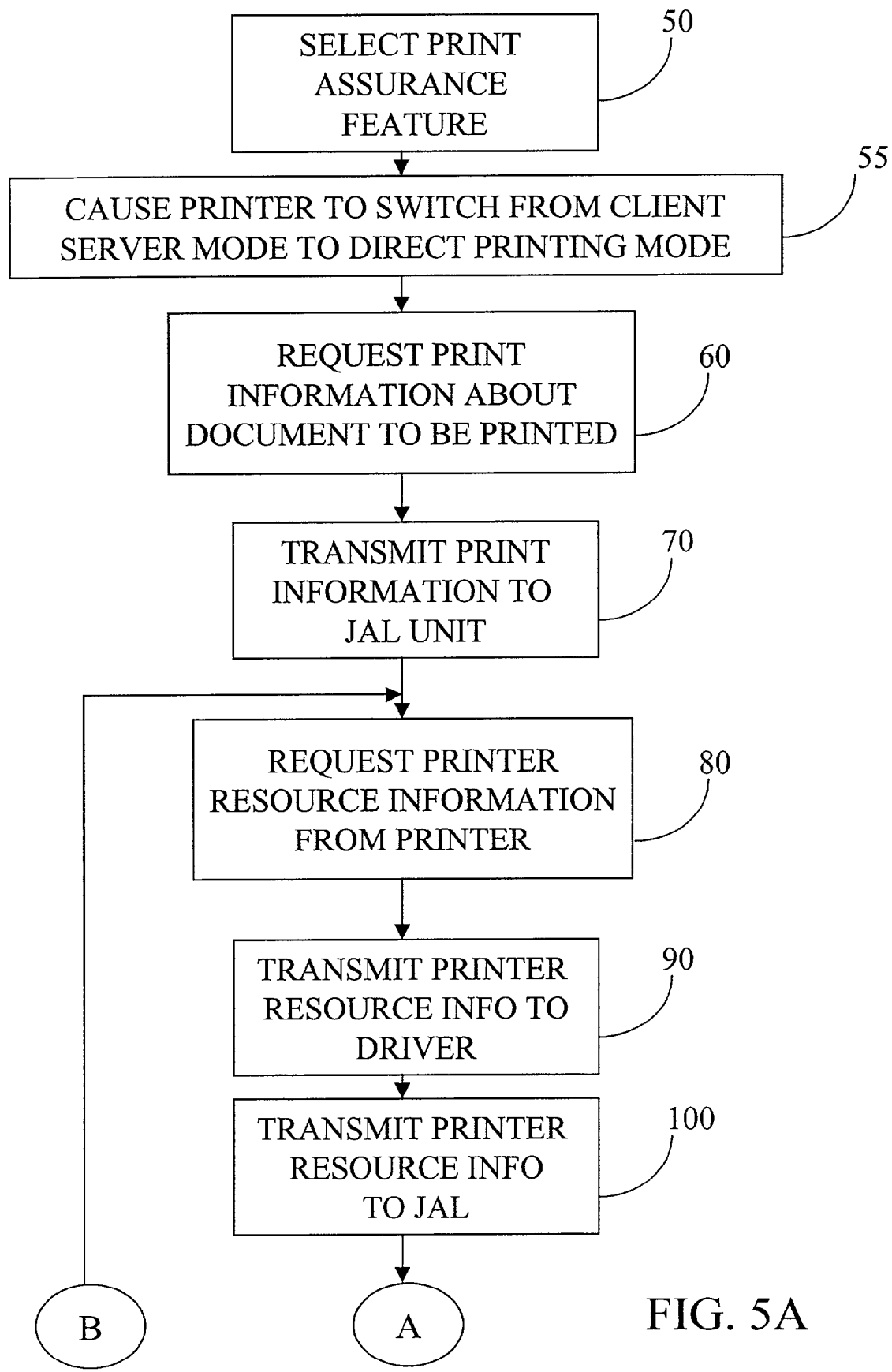
Figure 5B:
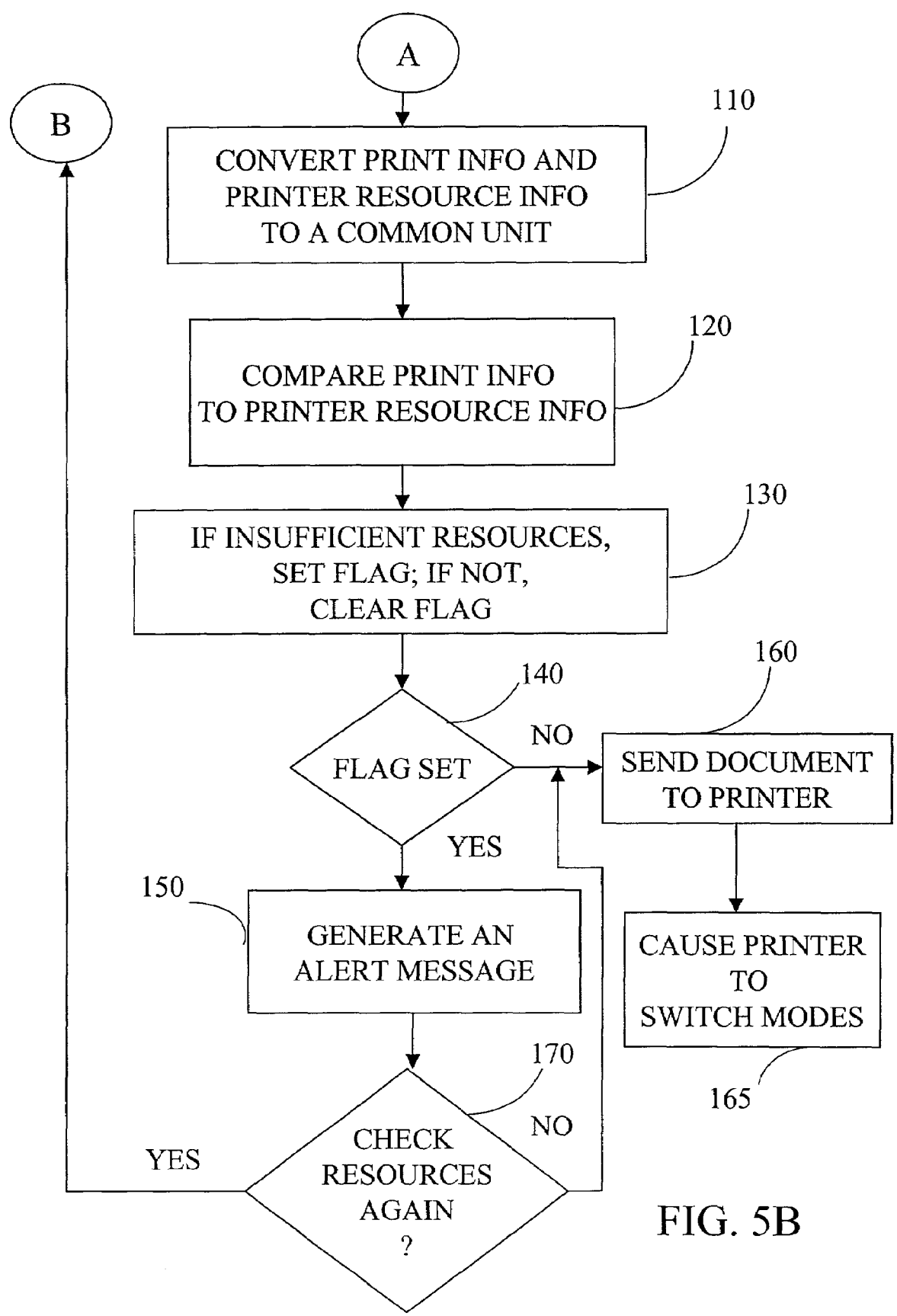

Referring also to a FIGS. 5A and 5B which align at connecting points A and B, the JAL unit 28 may be modified for operation in the computer network 34 of FIG. 2 by additionally programming the controller 48 to cause the print driver 16 to command the printer 38 to switch from a client server mode to a direct printing mode (step 55) after the print assurance feature has been selected (step 50) and before the driver 16 requests print information about the document to be printed (step 60). While in the client server mode, the printer 38 performs print tasks in an order by which the tasks are supplied by the printer server 40. As is well-known in the art, the print server 40 may be programmed to supply print jobs to the printer 38 in an order in which they are received by the print server 40 or may instead be programmed to supply print jobs to the printer 38 according to a priority level associated with the documents received at the print server 40. For example, all documents having the highest priority level may be printed before the lower priority level documents and documents having the same priority level may be supplied to the printer 38 according to an order in which they are received at the print server 40. In contrast, when switched to the direct printing mode, the printer 38 communicates with and performs printing tasks for only the user computer 10 from which the direct printing mode command was received. Thus, when the direct printing mode command is issued by the driver 16, the printer 38 stops responding to print commands issued by the print server 40 and instead communicates exclusively with the user computer 10 having the print driver 16 that issued the direct printing mode command. As described above, the JAL unit 28 may instruct the printer 38 to switch modes using a socketping command that includes a field designated to include an appropriate mode switching instruction. In addition, one having ordinary skill in the art will recognize that conventional printers typically include a mode switching capability and will further recognize that printers not equipped with such a mode switching capability may easily be programmed or otherwise modified to include such a capability.

After the direct printing mode command has been issued by the driver 16, the method continues as described above. In addition, after the controller 48 causes the driver 16 to send the document to the printer 38 for printing (step 160), the controller 48 causes the driver 16 to command the printer 38 to switch from the direct printing mode back to the client server mode thereby causing the printer 38 to again respond to print commands issued by the print server 40 (step 165).

From the foregoing description, it should be understood that an apparatus and method for estimating printer resources have been shown and described, both of which have many desirable attributes and advantages. The JAL unit 28 ensures that sufficient printer resources are available prior to printing a document thereby reducing the potential for wasted time and wasted resources. Specifically, the risk of sending a document to the printer, only to discover that the document is either illegible due to low print toner, or is missing pages because of a low paper supply, is minimized. Moreover, the method allows a user to temporarily switch the mode of printer operation from the client server mode to the direct printing mode thereby causing the JAL unit 28 to be compatible with computers 10, 32 that are coupled to a computer network 31 and thus share print resources. In addition, the direct printing mode allows the user to ensure that a document having a high priority is completely and legibly printed without delay.

While various embodiments of the present invention have been shown and described, it should be understood that other modifications, substitutions and alternatives are apparent to one of ordinary skill in the art. For example, although the JAL unit 28 is shown as being disposed in the computer 10, the JAL unit 28 may instead be located outside of the computer 10. In addition, although the JAL unit 28 is described as determining resources necessary to print a document generated by a word processor software application or a spreadsheet software application, the JAL unit 28 may perform the same function for documents printed by any software application that is capable of generating a document to be printed. Further, although the print assurance feature that invokes the JAL unit 28 is described as being selected using a print dialog window the feature may alternatively be selected using any software feature selection method. For example, software features are selectable using a pull-down menu, a mouse click and a touch screen. Further, if the first value representing the amount of printer resource required to print the document and the second value representing the amount of the printer resource available at the printer both are provided to the controller 48 in a common unit of measure, then the converter need not perform any conversion. Likewise, if the first and second values are always provided in a common unit measure then the converter need not even be included in the JAL unit 28.

In addition, although the print driver 16 and printer 18, 38 are described as communicating via the missile extension 29 and ping device 30, the print driver 16 and printer 18, 38 may instead communicate using any suitable communication device implemented using software, hardware, or any combination thereof. Such modifications, substitutions and alternatives can be made without departing from the spirit and scope of the invention, which should be determined from the appended claims.

Various features of the invention are set forth in the appended claims.

What is claimed is:

1. An apparatus for estimating printer resources, said apparatus comprising:
   a comparator configured and adapted to receive first and second values, said comparator further being adapted to compare said first value to said second value and to generate an output signal based on said comparison, wherein said first value represents a quantity of a printer resource needed to print a document and said second value represents an amount of said printer resource available at a printer;
   a controller coupled to said comparator, said controller being configured and adapted to control said comparator and to generate a first control signal based on said output signal and a second control signal for causing said printer to switch between a first mode of operation and a second mode of operation, said printer responding to a printer server while operating in said first made and said printer responding only to a printer driver residing on a computer different from said printer server while operating in said second mode.

2. The apparatus of claim 1 wherein said apparatus is disposed in a computer.

3. The apparatus of claim 1 wherein said apparatus is coupled to a computer.

4. The apparatus of claim 1 wherein said printer resource comprises paper.

5. The apparatus of claim 1 wherein said printer resource comprises toner.

6. The apparatus of claim 1 wherein said printer resource comprises ink.

7. A computer program product comprising a computer usable medium having computer readable program code embodied in said medium that when executed causes a computer to:
   compare a first value to a second value, said first value being an amount of a printer resource required to print a document and said second value being an amount of said printer resource available at a printer;
   generate a control signal based on said comparison; and
   cause said printer to switch from a first mode of operation to a second mode of operation when a print job assurance feature is selected, wherein said printer responds to a printer server while operating in said first mode and said printer responding only to a printer driver residing on a computer different from said printer server while operating in said second mode.

8. The computer program product of claim 7 further comprising computer readable program code embodied in said medium that when executed causes said computer to:
   cause said printer to switch from said second mode of operation to said first mode of operation after said document has been printed by said printer.

9. A method for estimating printer resources, comprising:
   causing a printer to switch from a client server mode in which said printer performs tasks supplied by a print server to a direct printing mode in which said printer performs only tasks supplied directly by a computer different from said print server;

comparing a first value to a second value, said first value representing an amount of a resource of said printer required to print a document and said second value representing an amount of said printer resource available at said printer;

causing said document to be printed if said second value is greater than said first value; and generating an indication signal if said first value is greater than said second value, said indication signal alerting a user that said amount of said printer resource available at said printer is insufficient to print said document.

10. The method of claim 9, further comprising causing the printer to switch from the direct printing mode back to the client server mode.

11. A computer program product comprising a computer usable medium having computer readable program code embodied in said medium that when executed causes a computer to:

cause a printer to switch from a client server mode in which said printer performs tasks supplied by a print server to a direct printing mode in which said printer performs only tasks supplied directly by a computer different from said print server;

compare a first value to a second value, said first value representing an amount of a resource of said printer required to print a document and said second value representing an amount of said printer resource available at said printer;

cause said document to be printed if said second value is greater than said first value; and generate an indication signal if said first value is greater than said second value, said indication signal alerting a user that said amount of said printer resource available at said printer is insufficient to print said document.

12. The computer program product of claim 11 further comprising computer readable program code embodied in said medium that when executed causes said computer to cause the printer to switch from the direct printing mode back to the client server mode.

* * * * *

UNITED STATES PATENT AND TRADEMARK OFFICE
CERTIFICATE OF CORRECTION

| | |
|---|---|
| PATENT NO. | : 6,977,742 B2 |
| APPLICATION NO. | : 09/823782 |
| DATED | : December 20, 2005 |
| INVENTOR(S) | : Mark A. Harper |

It is certified that error appears in the above-identified patent and that said Letters Patent is hereby corrected as shown below:

In column 8, line 29, in Claim 1, delete "made" and insert -- mode --, therefor.

In column 8, line 49, in Claim 7, after "document" insert -- , --.

Signed and Sealed this

Seventh Day of July, 2009

JOHN DOLL
*Acting Director of the United States Patent and Trademark Office*